United States Patent
Akatsuka et al.

(10) Patent No.: US 12,173,120 B2
(45) Date of Patent: Dec. 24, 2024

(54) RANDOM COPOLYMER COMPOUND, TERMINAL-MODIFIED POLYMER COMPOUND, AND RESIN COMPOSITION INCLUDING SAID COMPOUNDS

(71) Applicant: Nippon Kayaku Kabushiki Kaisha, Tokyo (JP)

(72) Inventors: Yasumasa Akatsuka, Tokyo (JP); Kazuteru Shirai, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 768 days.

(21) Appl. No.: 17/292,051

(22) PCT Filed: Nov. 1, 2019

(86) PCT No.: PCT/JP2019/042972
§ 371 (c)(1),
(2) Date: May 7, 2021

(87) PCT Pub. No.: WO2020/095829
PCT Pub. Date: May 14, 2020

(65) Prior Publication Data
US 2021/0395464 A1   Dec. 23, 2021

(30) Foreign Application Priority Data
Nov. 9, 2018 (JP) .................. 2018-211095

(51) Int. Cl.
| | | |
|---|---|---|
| C08G 81/02 | (2006.01) | |
| C08F 236/06 | (2006.01) | |
| C08G 65/38 | (2006.01) | |
| C08G 85/00 | (2006.01) | |
| C08K 5/095 | (2006.01) | |

(52) U.S. Cl.
CPC .......... *C08G 81/025* (2013.01); *C08F 236/06* (2013.01); *C08G 65/38* (2013.01); *C08G 85/004* (2013.01); *C08K 5/095* (2013.01); *C08G 2170/00* (2013.01); *C08G 2650/38* (2013.01)

(58) Field of Classification Search
CPC .... C08G 81/025; C08G 65/38; C08G 85/004; C08G 2170/00; C08G 2650/38; C08F 236/06; C08K 5/095
See application file for complete search history.

(56) References Cited

U.S. PATENT DOCUMENTS

| | | | | |
|---|---|---|---|---|
| 3,703,564 A | * | 11/1972 | White | ............... C08G 81/00 525/391 |
| 2008/0004369 A1 | * | 1/2008 | Seppala | ............... C08G 4/00 524/437 |
| 2008/0275185 A1 | * | 11/2008 | deKok | ............... C08G 64/183 525/137 |
| 2011/0152471 A1 | | 6/2011 | Kamalakaran et al. | |

FOREIGN PATENT DOCUMENTS

| | | |
|---|---|---|
| JP | 200151415 A | 2/2001 |
| JP | 2001106884 A | 4/2001 |
| JP | 2001192540 A | 7/2001 |
| JP | 20051274 A | 1/2005 |
| JP | 2010222408 A | 10/2010 |
| JP | 2011225767 A | 11/2011 |
| JP | 2013159638 A | 8/2013 |
| JP | 201460449 A | 4/2014 |
| WO | 2011077297 A1 | 6/2011 |

* cited by examiner

Primary Examiner — Ling Siu Cho
Assistant Examiner — Andrea Wu
(74) Attorney, Agent, or Firm — The Webb Law Firm

(57) ABSTRACT

A random copolymer compound of (A) a polyphenylene ether resin having phenolic hydroxy groups at both ends, (B) an aliphatic polymer having alcoholic hydroxy groups at both ends, and (C) an acid dichloride compound that is a binder is disclosed, wherein the number of mol a of the (A) polyphenylene ether resin, the number of mol b of the (B) aliphatic polymer, and the number of mol c of the (C) acid dichloride compound that is a binder satisfies the relationship $(a+b)>c$.

3 Claims, No Drawings

RANDOM COPOLYMER COMPOUND, TERMINAL-MODIFIED POLYMER COMPOUND, AND RESIN COMPOSITION INCLUDING SAID COMPOUNDS

CROSS-REFERENCE TO RELATED APPLICATIONS

This application is the United States national phase of International Application No. PCT/JP2019/042972 filed Nov. 1, 2019, and claims priority to Japanese Patent Application No. 2018-211095 filed Nov. 9, 2018, the disclosures of which are hereby incorporated by reference in their entirety.

BACKGROUND OF THE INVENTION

Field of the Invention

The present invention relates to a random copolymer compound, a terminal-modified polymer compound, and a resin composition including said compound which can be easily formed into a film by casting its solution on the substrate, and can provide the curing reaction with a radical initiator, and moreover the cured product is excellent in flexibility, heat resistance, water resistance, dielectric characteristic, and adhesiveness.

Description of Related Art

A phenoxy resin is a polymer compound having a very large molecular weight obtained by polymerizing a difunctional epoxy resin and a difunctional phenol compound. Because by adding the phenoxy resin, a typical epoxy resin composition and a radical polymerizable composition can be formed into film, the phenoxy resin is used as an important component of film shaped adhesive in the many technical fields. Particularly, in the electrical/electronic field, the phenoxy resin is used for the interlayer insulating layer and the copper foil with resin of the printed wiring board, and the like. However, the cured product of the resin composition including the phenoxy resin has excellent adhesiveness, but low heat resistance, and besides has a high dielectric constant and a high dielectric loss tangent (the dielectric constant is about 3.5 and the dielectric loss tangent is about 0.03 at 1 GHz of the frequency). Therefore, the actuality is that the resin composition including the phenoxy resin cannot be used for the recent electronic device applications where accelerated signal response speed is needed. As a resin having excellent dielectric characteristics such as a low dielectric constant and a low dielectric loss tangent, fluorine containing polymer compound such as polytetrafluoroethylene (PTFE) (Patent Literature 1) and liquid crystal polymer (Patent Literature 2) are generally known. However, there is problems that those resins have incredibly low compatibility with other resins and besides low adhesiveness.

Patent Literature 3 describes a method for mixing a rubber component to give polyphenylene ether resin flexibility. However, only polyphenylene ether resin, rubber component, and like give poor adhesiveness, therefore, an epoxy resin has to be added. The epoxy resin has excellent adhesiveness but generates highly polar alcoholic hydroxy groups during the reaction. Therefore, there is problems that the epoxy resin makes the dielectric characteristics worse as seen in the phenoxy resin.

CITATION LIST

Patent Literature

Patent Literature 1: JP 2005-001274 A
Patent Literature 2: JP 2014-060449 A
Patent Literature 3: JP 2010-222408 A

SUMMARY OF INVENTION

Technical Problem

The present invention was made in view of the above problems. One of the objects of the present invention is to provide a random copolymer compound and a terminal-modified polymer compound which have high heat resistance and adhesiveness together with exceptional film formation capabilities and further provide a low dielectric constant and a dielectric loss tangent; and a resin composition including the random copolymer compound or the terminal-modified polymer compound.

Solution to Problem

By earnest research, the present inventors found that the random copolymer compound of a polyphenylene ether resin having phenolic hydroxy groups at both ends and having a relatively low molecular weight, an aliphatic polymer having alcoholic hydroxy groups at both ends, and a binder; and the terminal-modified polymer compound obtained by modifying the end of the random copolymer compound with a compound having an unsaturated double bond satisfy the needs aforementioned so as to finish the present invention.

That is, the present invention relates to the followings:

[1] A random copolymer compound of:
(A) a polyphenylene ether resin having phenolic hydroxy groups at both ends,
(B) an aliphatic polymer having alcoholic hydroxy groups at both ends, and
(C) an acid dichloride compound that is a binder,
wherein the number of mol a of (A) the polyphenylene ether resin, the number of mol b of (B) the aliphatic polymer and the number of mol c of (C) the acid dichloride compound that is a binder satisfy relationship (a+b)>c.

[2] The random copolymer compound according to item [1], wherein the number of mol a and the number of mol b satisfy relationship a>b.

[3] The random copolymer compound according to item [1] represented by a following formula (1):

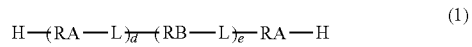

(1)

wherein RA represents a bivalent connection group obtained by removing two hydrogen atoms from the phenolic hydroxy groups at both ends of (A) the polyphenylene ether resin having phenolic hydroxy groups at both ends, RB represents a bivalent connection bond obtained by removing two hydrogen atoms from the alcoholic hydroxy groups at both ends of (B) the aliphatic polymer having alcoholic hydroxy groups at both ends, and L represents a bivalent connection group represented by a following formula (2):

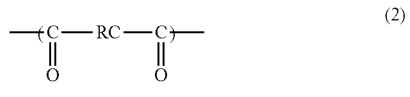
(2)

wherein RC represents a bivalent connection group obtained by removing two acid chloride groups from (C) the acid dichloride compound that is a binder, and d and e are average values of numbers of repeating unit and represent each independently a real number in the range between 1 and 100.

[4] The random copolymer compound according to item [3], wherein RA is a bivalent connection group represented by a following formula (3):

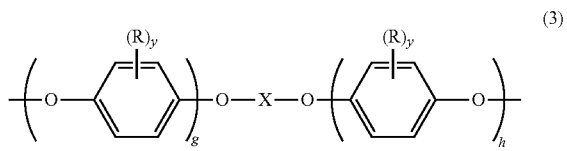
(3)

wherein X represents a bivalent connection group obtained by removing two phenolic hydroxy groups from the compound having two phenolic hydroxy groups, R represents each independently methyl group, ethyl group, propyl group, allyl group or phenyl group, g and h are average values of numbers of repeating unit and represent each independently a real number in the range between 1 and 100, and y each independently represents an integer from 1 to 4.

[5] The random copolymer compound according to item [4], wherein X is a bivalent connection group obtained by removing two phenolic hydroxy groups from bisphenol A, tetramethylbisphenol A, bisphenol F or 4,4'-biphenol.

[6] The random copolymer compound according to any one of items [3] to [5], wherein RB is a bivalent connection group obtained by removing two hydrogen atoms from the alcoholic hydroxy groups at both ends of a polybutadiene rubber having alcoholic hydroxy groups at both ends.

[7] A terminal-modified polymer compound which is a reaction product of the random copolymer compound according to any one of items [1] to [6] with (D) a compound having a substituent reactive to hydroxy group and an unsaturated double bond group.

[8] The terminal-modified polymer compound according to item [7], wherein (D) the compound having a substituent reactive to hydroxy group and an unsaturated double bond is a compound having an acid chloride group and an unsaturated double bond group, a compound having an isocyanate group and an unsaturated double bond group, or a compound having a chlorodimethylsilane group and an unsaturated double bond group.

[9] The terminal-modified polymer compound according to item [8] represented by a following formula (4):

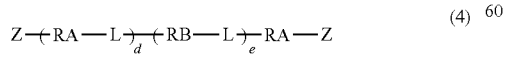
(4)

wherein RA, RB, L, d and e represent the same meanings as RA, RB, L, d, and e in the formula (1) according to claim 3, Z each independently represents a substituent represented by the following formula (5-1), (5-2), or (5-3):

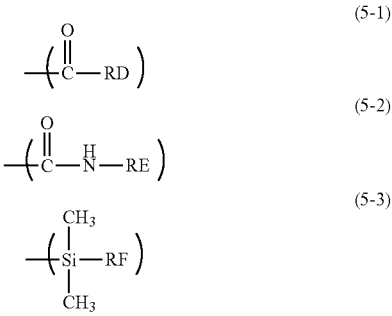

wherein RD represents a residue obtained by removing the acid chloride group from the compound having an acid chloride group and an unsaturated double bond group in one molecule, RE represents a residue obtained by removing the isocyanate group from the compound having an isocyanate group and an unsaturated double bond group in one molecule, and RF represents a residue obtained by removing the chlorodimethylsilane group from the compound having a chlorodimethylsilane group and an unsaturated double bond group in one molecule.

[10] A resin composition comprising the random copolymer compound according to any one of items [1] to [6] or the terminal-modified polymer compound according to any one of items [7] to [9], and a radical initiator.

[11] A film shaped adhesive obtained from the resin composition according to item [10].

[12] A cured product of the resin composition according to item [10] or the film shaped adhesive according to item [11].

Effects of the Invention

According to the present invention, the random copolymer compound and the terminal-modified polymer compound can be made into the resin composition using a radical initiator, which can be easily formed into a film by a casting method. The resin composition can be cured to provide a cured product which is excellent in the properties including flexibility, heat resistance, water resistance, dielectric characteristics, and adhesiveness.

DESCRIPTION OF THE INVENTION

The forms to carry out the present invention are described below.

<Random Copolymer Compound>

(A) The polyphenylene ether resin having phenolic hydroxy groups at both ends (hereinafter also simply referred to as "component (A)") which is a material for the random copolymer compound of the present invention can have the structure generally represented by the following formula (8).

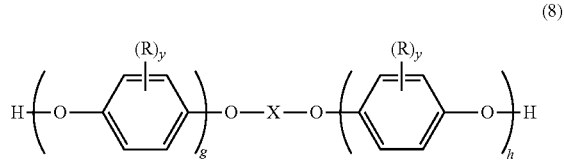
(8)

In the formula (8), X represents a bivalent connection group obtained by removing two phenolic hydroxy groups from the compound having two phenolic hydroxy groups. Examples of the compound having two phenolic hydroxy groups include bisphenol A, tetramethylbisphenol A, bisphenol F, and 4,4'-biphenol.

In the formula (8), R represents methyl group, ethyl group, propyl group, allyl group or phenyl group.

In the formula (8), y represents an integer from 1 to 4.

In the formula (8), g and h are average values of numbers of repeating unit and represent each independently a real number in the range between 1 and 100.

For component (A), the resin usually having a number average molecular weight from thousands to hundreds of thousands is commercially available, but the resin having a number average molecular weight equal to or less than ten thousand is preferable as a material for the random copolymer compound of the present invention. Examples of the commercially available component (A) include, but is not limited to, NORYL SA90 (number average molecular weight 1,700) manufactured by Saudi Basic Industries Corporation (SABIC).

Note that the number molecular weight herein is meant to be a value calculated in terms of polystyrene based on the measurement results of gel permeation chromatography (GPC).

Examples of (B) the aliphatic polymer having alcoholic hydroxy groups at both ends (hereinafter also simply referred to as "component (B)") which is a material for the random copolymer compound of the present invention include butadiene copolymer having alcoholic hydroxy groups at both ends and hydrogenated butadiene copolymer having alcoholic hydroxy groups at both ends. The number average molecular weight of the component (B) is usually 500 to 10,000 and preferably 750 to 7,000.

In manufacturing the random copolymer compound of the present invention, the amounts of the components (A) and (B) are not particularly limited. The number of mol of the component (B) may be higher than that of the component (A). The number of mol of the component (A) may be higher than that of the component (B). The components (A) and (B) may be equimolar. Preferably, the number of mol of the component (A) is higher than that of the component (B), namely the number of mol a of the component (A) and the number of mol b of the component (B) preferably satisfies the relationship a>b. By satisfying the preferable relationship relating to the amounts of the components (A) and (B), the copolymer compound excellent in heat resistance and solvent solubility can be obtained.

As (C) an acid dichloride compound which is a binder (hereinafter also simply referred to as "component (C)") and is a material for the random copolymer compound of the present invention, any of the acid dichloride compound can be used. The acid dichloride component is not particularly limited to, but specific examples of the component (C) include phthalic acid dichloride, glutaryl chloride, isophthalic acid dichloride, terephthalic acid dichloride, oxalyl chloride, malonyl chloride, adipoyl chloride, azelaoyl chloride, sebacoyl chloride, azobenzene-4,4'-dicarbonyldichloride, 4,4'-biphenyldicarbonylchloride, itaconic acid chloride, hexahydroterephthalic acid dichloride, 2,6-naphtalenedicarbonic acid chloride, 4,4'-oxydibenzoylchloride, 2,5-furandicarbonyldichloride and diglycolylchloride.

The random copolymer compound of the present invention has the structure obtained by randomly copolymerizing the component (A) and the component (B) via the component (C). The copolymerization may occur via the component (C), between two components, namely component (A)s each other, the component (B)s each other, and the component (A) and the component (B). The copolymer obtained has the structure where an ester bond connects these components.

The random copolymer compound of the present invention has phenolic hydroxy groups and/or alcoholic hydroxy groups at both ends, that is, a copolymer of the component (A), the component (B) and the component (C) where the number of mol a of the component (A), the number of mol b of the component (B) and the number of mol c of the component (C) satisfy the relationship (a+b)>c. Because the random copolymer compound has phenolic hydroxy groups and/or alcoholic hydroxy groups at the both ends, the both ends of the random copolymer compound can be modified with (D) the compound described below having a substituent reactive to the hydroxy groups and an unsaturated double bond group to produce the terminal-modified polymer compound of the present invention.

The random copolymer compound of the present invention is preferably a compound represented by the following formula (1).

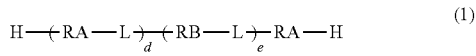

In the formula (1) RA represents a bivalent connection group obtained by removing two hydrogen atoms from the phenolic hydroxy groups at both ends of (A) the polyphenylene ether resin having phenolic hydroxy groups at both ends, RB represents a bivalent connection bond obtained by removing two hydrogen atoms from the alcoholic hydroxy groups at both ends of (B) the aliphatic polymer having alcoholic hydroxy groups at both ends, L represents a bivalent connection group represented by the following formula (2), and d and e are average values of numbers of repeating unit and represent each independently a real number in the range between 1 and 100.

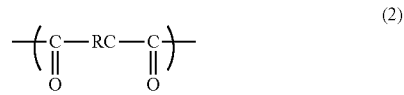

In the formula (2) RC represents a bivalent connection group obtained by removing two acid chloride groups (—COCl group) from (C) the acid dichloride compound that is a binder.

The random copolymer compound of the present invention is more preferably a compound wherein the RA in the above formula (1) is a bivalent connection group represented by the following formula (3).

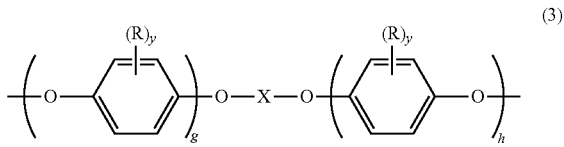

In the formula (3) X represents a bivalent connection group obtained by removing two phenolic hydroxy groups from the compound having two phenolic hydroxy groups, R represents each independently methyl group, ethyl group, propyl group, allyl group or phenyl group, g and h are average values of numbers of repeating unit and represent each independently a real number in the range between 1 and 100, and y each independently represents an integer from 1 to 4.

The random copolymer compound of the present invention is also more preferably a compound wherein X in the above formula (3) is a bivalent connection group obtained by removing two hydroxy groups from bisphenol A, tetramethylbisphenol A, bisphenol F or 4,4'-biphenol.

The random copolymer compound of the present invention is also more preferably a compound wherein RB in the above formula (1) is a bivalent connection group obtained by removing two hydrogen atoms from the alcoholic hydroxy groups at both ends of a polybutadiene rubber having alcoholic hydroxy groups at both ends.

<Terminal-Modified Polymer Compound>

The terminal-modified polymer compound of the present invention is a compound obtained by modifying the phenolic hydroxy group and/or the alcoholic hydroxy group at the ends of the random copolymer compound of the present invention with (D) the compound having a substituent reactive to hydroxy group and an unsaturated double bond group (hereinafter also simply referred to as "component (D)"). Modification is provided by the reaction of the hydroxy group at the ends of the random copolymer compound with the substituent reactive to the hydroxy group in the component (D). Both ends or only one end of the random copolymer compound may be modified, but the terminal-modified polymer compound modified at both ends is preferable.

The component (D) used for the terminal modification of the random copolymer compound is not limited as long as the component (D) is a compound having a substituent reactive to hydroxy group and an unsaturated double bond group in one molecule, but the component (D) is preferably a compound having an acid chloride group and an unsaturated double bond group in one molecule, a compound having an isocyanate group and an unsaturated double bond group in one molecule, or a compound having a chlorodimethylsilane group and an unsaturated double bond group in one molecule.

Note that "unsaturated double bond group" in this specification is not limited as long as the substituent having a carbon-carbon double bond. But, examples of the unsaturated double bond group include vinyl group, allyl group, propenyl group, butenyl group, pentenyl group, hexenyl group, cyclohexenyl group, and heptenyl group, and vinyl group or allyl group is preferable.

Examples of the compound having an acid chloride group and an unsaturated double bond group in one molecule include methacrylic acid chloride and acrylic acid chloride.

Examples of the compound having an isocyanate group and an unsaturated double bond group in one molecule include 2-isocyanatoethylmethacrylate, 2-isocyanatoethylacrylate, 2-[(3,5-dimethylpyrazolyl)carbonylamino]ethylmethacrylate, 1,1-(bisacryloyloxymethyl)ethylisocyanate and vinylbenzylchloride, and isocyanic acid 3-isopropenyl-α,α-dimethylbenzyl.

Examples of the compound having a chlorodimethylsilane group and an unsaturated double bond group in one molecule include vinyldimethylchlorosilane and allyldimethylchlorosilane.

The terminal-modified polymer compound of the present invention is preferably a compound represented by the following formula (4).

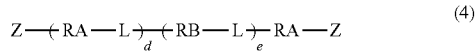

In the formula (4), RA, RB, L, d, and e represent the same as RA, RB, L, d and e in the formula (1), respectively. Z each independently represents substituent represented by the following formula (5-1), (5-2), or (5-3).

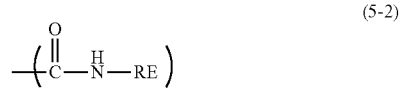

In the formula (5-1), RD represents a residue obtained by removing the acid chloride group from the compound having an acid chloride group and an unsaturated double bond group in one molecule. In the formula (5-2) RE represents a residue obtained by removing the isocyanate group from the compound having an isocyanate group and an unsaturated double bond group in one molecule. In the formula (5-3) RF represents a residue obtained by removing the chlorodimethylsilane group from the compound having a chlorodimethylsilane group and an unsaturated double bond group in one molecule.

<Manufacturing Methods of Random Copolymer Compound and Terminal-Modified Polymer Compound>

Next, the manufacturing methods of the random copolymer compound and the terminal-modified polymer compound will be explained.

After dissolving the component (A) and the component (B) in solvent homogeneously, the component (C) is added thereto and reacted under heating to obtain the random copolymer compound of the present invention. Note that the number of mol of the component (A) is preferably higher than the number of mol of the component (B). The component (D) is further added to the random copolymer compound of the present invention obtained above and reacted under heating to obtain the terminal-modified polymer compound of the present invention. Examples of the solvent include toluene, xylene, methylisobutylketone, cyclopentanone, cyclohexanone, N-methylpyrrolidone, dimethylformamide and dimethylacetamide. The mixture thereof may be used. Toluene is particularly preferable, because of low boiling point and of dry easiness. The reaction temperature relating to both the reaction of addition of the component (C) and the reaction of addition of the component (D) is usually 50 to 150° C., preferably 60 to 140° C. The reaction time is preferably 5 to 60 hours.

To accelerate the reaction, a catalyst may be used together. As a catalyst an organic base compound such as triethylamine, tripropylamine and pyridine is preferably used.

When the organic base catalyst is used, hydrochloric acid generated by the reaction and the organic base form a salt to perform the reaction safely without corroding the reaction device due to the hydrochloric acid. After the reaction, the salt generated can be easily removed by filtration. The organic base catalyst acts as a catalyst not only when the component (D) is an acid chloride compound, but also when an isocyanate compound and a dimethylchlorosilane compound are used as the component (D). The amount of the catalyst used is usually 0.1 to 200% by mass, preferably 0.5 to 100% by mass to the total amount of the reactant.

Also, to prevent the polymerization between the double bonds in the molecule during the reaction, a polymerization inhibitor is preferably added before the reaction. Examples of the polymerization inhibitor include p-methoxyphenol and methylhydroquinone.

The molecular weight of the random copolymer compound and the terminal-modified polymer compound of the present invention thus obtained preferably ranges from 10,000 to 200,000, more preferably from 15,000 to 150,000, as a weight-average molecular weight in terms of polystyrene in GPC. When the molecular weight is smaller than the range, the film formation capability is sometimes insufficient. When the molecular weight is larger than the range, the viscosity become higher, and therefore coating is sometimes difficult to perform.

<Resin Composition>

The resin composition of the present invention is a mixture including the radical initiator and one or both of the random copolymer compound and the terminal-modified polymer compound of the present invention. The amount of the radical initiator used for the resin composition of the present invention is 0.1 to 10 parts by mass, preferably 0.1 to 8 parts by mass based on 100 parts by mass of total amount of the resin components. Typical examples of the radical initiator include a peroxide such as benzoylperoxide, cumenehydroperoxide, 2,5-dimethylhexane-2,5-dihydroperoxide, 2,5-dimethyl-2,5-di(t-butylperoxi)-3-hexyne, di-t-butylperoxide, t-butylcumylperoxide, α,α-bis(t-butylperoxi-m-isopropyl)benzene, 2,5-dimethyl-2,5-di(t-butylperoxi)hexane, dicumylperoxide, di-t-butylperoxiisophthalate, t-butylperoxibenzoate, 2,2-bis(t-butylperoxi)butane, 2,2-bis(t-butylperoxi)octane, 2,5-dimethyl-2,5-di(benzoylperoxi)hexane, di(trimethylsilyl) peroxide and trimethylsilyltriphenylsilylperoxide.

The organic solvent may be used together with the resin composition of the present invention. Examples of the organic solvent include aromatic solvent such as toluene and xylene, ether solvent such as diethyleneglycoldimethylether, diethyleneglycoldiethylether, propyleneglycol, propyleneglycolmonomethylether, propyleneglycolmonomethylethermonoacetate and propyleneglycolmonobutylether, ketone solvent such as methylethylketone, methylisobutylketone, cyclopentanone and cyclohexanone, lactone such as γ-butyrolactone and γ-valerolactone, amido solvent such as N-methylpyrolidone (NMP), N,N-dimethylformamide (DMF), N,N-dimethylacetoamide and N,N-dimethylimidazolidinone, sulfone such as tetramethylenesulfone. The content amount of the organic solvent in the resin composition of the present invention is usually equal to and less than 90% by mass, preferably 30 to 80% by mass in the resin composition.

The polymerization inhibitor may be used together with the resin composition of the present invention to improve storage stability. The generally well-known polymerization inhibitor may be used and include quinone such as hydroquinone, methylhydroquinone, p-benzoquinone, chloranil, trimethylquinone, aromatic diol, and di-t-butylhydroxytoluene.

The resin composition of the present invention may contain the radical polymerizable compound to improve heat resistance and the like. Concretely the radical polymerizable compound is selected from the group consisting of triallylisocyanurate, triallylcyanurate, divinylbenzene, isophthalic acid divinyl, N-phenyl-maleimide, N-phenyl-methylmaleimide, N-phenyl-chloromaleimide, N-p-chlorophenyl-maleimide, N-p-methoxyphenyl-maleimide, N-p-methylphenyl-maleimide, N-p-nitrophenyl-maleimide, N-p-phenoxyphenyl-maleimide, N-p-phenylaminophenyl-maleimide, N-p-phenoxycarbonylphenyl-maleimide, 1-maleimide-4-acetoxysuccinimide-benzene, 4-maleimide-4'-acetoxysuccinimide-diphenylmethane, 4-maleimide-4'-acetoxysuccinimide-diphenylether, 4-maleimide-4'-acetamido-diphenylether, 2-maleimide-6-acetamide-pyridine, 4-maleimide-4'-acetamide-diphenylmethane, and N-p-phenylcarbonylphenyl-maleimide-N-ethylmaleimide, N-2,6-xylylmaleimide, N-cyclohexylmaleimide, N-2,3-xylylmaleimide, xylylmaleimide, 2,6-xylenemaleimide, 4,4'-bismaleimidediphenylmehtane, and the mixture thereof.

For giving the desired property according to the application, the resin composition of the present invention can contain fillers and additives, as long as the amounts of the fillers and the additives are in the range that the original properties of the resin composition are not damaged. The fillers may be either fiber or powder form and examples include silica, carbon black, alumina, talc, mica, glass beads and hollow glass sphere.

Flame-retardant compound, additives and the like can be used together with the resin composition of the present invention. The flame-retardant compound, additives and the like are not particularly limited as long as they are generally used. Examples of the flame-retardant compound include bromine compound such as 4,4-dibromobiphenyl; phosphoric acid ester; phosphoric acid melamine; phosphorus-containing epoxy resin; nitrogen compound such as melamine; benzoguanamine; oxazine ring-containing compound; and silicone compound. Examples of the additives include ultraviolet absorber, antioxidant, photopolymerization initiator, fluorescent brightening agent, photosensitizer, dye, pigment, thicker, lubricant, deforming agent, dispersant, leveling agent and brightener. These flame-retardant compounds and additives can be used in combination according to desire.

The resin composition of the present invention can be used by applying on or impregnating various substrates. For example, film shaped adhesive obtained by removing organic solvent after applying the resin composition containing the organic solvent on a PET film can be used as an interlayer insulation layer of a multilayer printed board. Also, a polyimide film having the film shaped adhesive thereon obtained by the same method as mentioned above can be used as a cover lay film. A copper foil having the film shaped adhesive on thereon obtained by the same method mentioned above can be used as a resin coated copper foil. By impregnating glass cloth, glass paper, carbon fiber, various nonwoven fabric and the like with the resin composition, the resultant products can be used as a printed wiring board and a prepreg of the CFRP.

The interlayer insulation layer, the cover lay film, the resin coated copper foil, the prepreg and the like can be molded with heat and pressure by a hot press machine to obtain the cured product.

EXAMPLES

The present invention now will be described in more detail with reference to the Examples and the Comparative Examples, but the present invention is not intended to be limited to these Examples.

Example 1 (Synthesis of Random Copolymer Compound 1 of Present Invention)

24 parts (0.0141 mol) of polyphenylene ether resin having phenolic hydroxy groups at both ends (SA-90, manufactured by SABIC, average molecular weight 1,700), 16 parts (0.0053 mol) of polybutadiene resin having alcoholic hydroxy groups at both ends (G-3000, manufactured by NIPPON SODA CO., LTD., average molecular weight 3,000), 50 parts of toluene and 0.2 parts of 4-methoxyphenol were added into a flask equipped with a thermometer, a cooling pipe and a stirrer, further stirred and dissolved. Then, 5 parts of triethylamine were added as a catalyst. The temperature of the solution obtained was raised to 105° C. 3.29 parts (0.0162 mol) of terephthalic acid dichloride dissolved in 30 parts of toluene were added dropwise to the solution over 10 minutes and the reaction was conducted at 105° C. for 2 hours. Then, triethylamine hydrochloride generated by the reaction was removed by filtration. By concentrating the filtrate under reduced pressure, triethylamine and toluene were distilled off together. In addition, the amount of toluene was adjusted to obtain 120 parts of the toluene solution containing 35% random copolymer compound 1. The random copolymer compound 1 obtained had a weight average molecular weight of 83,000 and a number average molecular weight of 10,000. Note that the weight average molecular weight and the number average molecular weight herein means the value calculated in terms of polystyrene based on the measurement results of gel permeation chromatography (GPC).

Example 2 (Synthesis of Terminal-Modified Polymer Compound 1 of Present Invention)

24 parts (0.0141 mol) of polyphenylene ether resin having phenolic hydroxy groups at both ends (SA-90, manufactured by SABIC, average molecular weight 1,700), 16 parts (0.0053 mol) of polybutadiene resin having alcoholic hydroxy groups at both ends (G-3000, manufactured by NIPPON SODA CO., LTD., average molecular weight 3,000), 50 parts of toluene and 0.2 parts of 4-methoxyphenol were added into a flask equipped with a thermometer, a cooling pipe and a stirrer, further stirred and dissolved. Then 5 parts of triethylamine were added as a catalyst. The temperature of the solution obtained was raised to 105° C. 3.29 parts (0.0162 mol) of terephthalic acid dichloride dissolved in 30 parts of toluene were added dropwise to the solution over 10 minutes and the reaction was conducted at 105° C. for 2 hours. After the temperature of the system was decreased to 80° C., 0.678 parts (0.0064 mol) of methacrylic acid chloride were added and the reaction was conducted at 80° C. for 2 hours. Then triethylamine hydrochloride generated by the reaction was removed by filtration. By concentrating the filtrate under reduced pressure, triethylamine residue and toluene were distilled off together. In addition, the amount of toluene was adjusted to obtain 123 parts of the toluene solution containing 35% terminal-modified polymer compound 1. Terminal-modified polymer compound 1 obtained had a weight average molecular weight of 85,000 and a number average molecular weight of 11,000.

Example 3 (Synthesis of Terminal-Modified Polymer Compound 2 of Present Invention)

24 parts (0.0141 mol) of polyphenylene ether resin having phenolic hydroxy groups at both ends (SA-90, manufactured by SABIC, average molecular weight 1,700), 16 parts (0.0053 mol) of polybutadiene resin having alcoholic hydroxy groups at both ends (G-3000, manufactured by NIPPON SODA CO., LTD., average molecular weight 3,000), 50 parts of toluene, and 0.2 parts of 4-methoxyphenol were added into a flask equipped with a thermometer, a cooling pipe and a stirrer, further stirred and dissolved. Then 5 parts of triethylamine were added as a catalyst. The temperature of the solution was raised to 105° C. 3.29 parts (0.0162 mol) of terephthalic acid dichloride dissolved in 30 parts of toluene were added dropwise to the solution over 10 minutes and the reaction was performed at 105° C. for 2 hours. After the temperature of the system was decreased to 80° C., 1.005 parts (0.0064 mol) of 2-isocyanatoethyl methacrylate were added and the reaction was conducted at 80° C. for 2 hours. Then triethylamine hydrochloride generated by the reaction was removed by filtration. By concentrating the filtrate under reduced pressure, triethylamine residue and toluene were distilled off together. In addition, the amount of toluene was adjusted to obtain 123 parts of the toluene solution containing 35% terminal-modified polymer compound 2. Terminal-modified polymer compound 2 obtained had a weight average molecular weight of 84,500 and a number average molecular weight of 12,000.

Example 4 (Synthesis of Terminal-Modified Polymer Compound 3 of Present Invention)

24 parts (0.0141 mol) of polyphenylene ether resin having phenolic hydroxy groups at both ends (SA-90, manufactured by SABIC, average molecular weight 1,700), 16 parts (0.0053 mol) of polybutadiene resin having alcoholic hydroxy groups at both ends (G-3000, manufactured by NIPPON SODA CO., LTD., average molecular weight 3,000), 50 parts of toluene and 0.2 parts of 4-methoxyphenol were added into a flask equipped with a thermometer, a cooling pipe and a stirrer, further stirred and dissolved. Then 5 parts of triethylamine were added as a catalyst. The temperature of the solution obtained was raised to 105° C. 3.29 parts (0.0162 mol) of terephthalic acid dichloride dissolved in 30 parts of toluene were added dropwise to the solution over 10 minutes and the reaction was conducted at 105° C. for 2 hours. After the temperature of the system was decreased to 80° C., 0.768 parts (0.0064 mol) of vinyldimethyldichlorosilane were added and the reaction was conducted at 80° C. for 2 hours. Then, triethylamine hydrochloride generated by the reaction was removed by filtration. By concentrating the filtrate under reduced pressure, triethylamine residue and toluene were distilled off together. In addition, the amount of toluene was adjusted to obtain 123 parts of the toluene solution containing 35% terminal-modified polymer compound 3. Terminal-modified polymer compound 3 obtained had a weight average molecular weight of 87,000 and a number average molecular weight of 13,000.

Examples 5 to 8

0.06 parts of dicumyl peroxide was added as a radical initiator to 10 parts of each solution of random copolymer compound 1 and terminal-modified polymer compounds 1 to 3 obtained in Examples 1 to 4 and mixed homogenously to obtain resin compositions 1 to 4 of the present invention. Resin compositions 1 to 4 obtained above were applied by using applicator on a polyimide film to form a film having a thickness of 200 μm. After drying the solvent by heating the film obtained at 90° C. for 10 minutes, the film was further heated in a vacuum oven at 180 for 1 hour to obtain the cured products of resin compositions 1 to 4 of the present invention. The cured products obtained had a thickness of 75 μm and sufficient flexibility and strength.

(Measurement of Tensile Strength, Elasticity, Glass Transition Temperature and Dielectric Characteristics)

For the cured products of resin compositions 1 to 4 of the present invention obtained in Examples 5 to 8, tensile strength and elasticity were measured by using Autograph AGX-50 (manufactured by Shimazu Corporation); glass transition temperature was measured by using dynamic viscoelasticity measuring device EXSTAR6000 (manufactured by SEIKO EPSON CORPORATION); and dielectric constant and dielectric loss tangent at 1 GHz were measured by using Network analyzer 8719ET (manufactured by Agilent Technologies Japan, Ltd.) with cavity resonance method. The results were shown in Table 1.

(Measurement of Adhesive Strength)

Resin compositions 1 to 4 of the present invention obtained in Examples 5 to 8 were applied by using an applicator on the mat surface of a high frequency low roughness copper foil having a thickness of 12 μm (CF-T4X-SV: manufactured by FUKUDA METAL FOIL & POWDER CO., LTD.) to obtain the film having a thickness of 50 μm. The solvent was dried by heating the films at 90° C. for 10 minutes to obtain copper foils with the film shaped adhesive obtained from the resin compositions of the present invention, respectively. The adhesive surface of the copper foil obtained above and the mat surfaces of another copper foil were superposed on each other. After curing in the vacuum press at the pressure of 3 MPa at a temperature of 180° C. for 1 hour was conducted, the 90° peeling strengths (adhesive strength) between the copper foils and the cured products of the resin compositions were measured by using Autograph AGX-50 (manufactured by Shimazu Corporation). The results were shown in the Table 1.

As shown above, the resin composition including the random copolymer compound or the terminal-modified polymer compound of the present invention and the cured product of the resin composition had high flexibility and provided excellent heat resistance, dielectric characteristics and adhesiveness.

The invention claimed is:

1. A terminal-modified polymer compound which is a reaction product of a random copolymer compound with (D) a compound having a substituent reactive to hydroxy group and an unsaturated double bond group,
    wherein the random copolymer compound is of:
    (A) a polyphenylene ether resin having phenolic hydroxy groups at both ends,
    (B) a butadiene polymer having alcoholic hydroxy groups at both ends or a hydrogenated butadiene polymer having alcoholic hydroxy groups at both ends, and
    (C) an acid dichloride compound that is a binder,
    wherein the number of mol a of (A) the polyphenylene ether resin, the number of mol b of (B) the butadiene polymer or the hydrogenated butadiene polymer and the number of mol c of (C) the acid dichloride compound that is a binder satisfy relationship (a+b) >c.

2. The terminal-modified polymer compound according to claim 1, wherein (D) the compound having a substituent reactive to hydroxy group and an unsaturated double bond is a compound having an acid chloride group and an unsaturated double bond group, a compound having an isocyanate group and an unsaturated double bond group, or a compound having a chlorodimethylsilane group and an unsaturated double bond group.

3. The terminal-modified polymer compound according to claim 2 represented by a following formula (4):

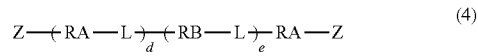

(4)

wherein RA represents a bivalent connection group obtained by removing two hydrogen atoms from the phenolic hydroxy groups at both ends of (A) the polyphenylene ether resin having phenolic hydroxy groups at both ends, RB represents a bivalent connection bond obtained by removing two hydrogen atoms from the alcoholic hydroxy groups at both ends of (B) the aliphatic polymer having alcoholic hydroxy groups

TABLE 1

Evaluation results of resin compositions

|  | Example 5 Resin composition 1 | Example 6 Resin composition 2 | Example 7 Resin composition 3 | Example 8 Resin composition 4 |
| --- | --- | --- | --- | --- |
| Random copolymer compound | 1 | | | |
| Terminal-modified polymer comound | | 1 | 2 | 3 |
| Tensile strength (MPa) | 30.4 | 36.6 | 35.4 | 38 |
| Elasticity (GPa) | 1 | 1.2 | 1.1 | 1.3 |
| Glass transition temperature (° C.) | 184 | 188 | 188 | 186 |
| Dielectric constant (1 GHz) | 2.53 | 2.64 | 2.67 | 2.63 |
| Dielectric loss tangent (1 GHz) | 0.0027 | 0.0023 | 0.0023 | 0.0022 |
| Adhesive strength (N/mm) | 0.7 | 0.82 | 0.83 | 0.8 | at both ends, and L represents a bivalent connection group represented by a following formula (2):

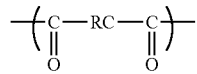 (2)

wherein RC represents a bivalent connection group obtained by removing two acid chloride groups from (C) the acid dichloride compound that is a binder, and d and e are average values of numbers of repeating unit and represent each independently a real number in the range between 1 and 100, wherein Z each independently represents a substituent represented by the following formula (5-1), (5-2), or (5-3):

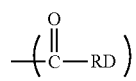 (5-1)

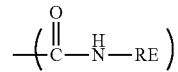 (5-2)

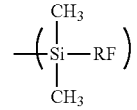 (5-3)

wherein RD represents a residue obtained by removing the acid chloride group from the compound having an acid chloride group and an unsaturated double bond group in one molecule, RE represents a residue obtained by removing the isocyanate group from the compound having an isocyanate group and an unsaturated double bond group in one molecule, and RF represents a residue obtained by removing the chlorodimethylsilane group from the compound having a chlorodimethylsilane group and an unsaturated double bond group in one molecule.

* * * * *